United States Patent [19]
Vaught

[11] Patent Number: 5,131,637
[45] Date of Patent: Jul. 21, 1992

[54] WORK HOLDER FOR HONEYCOMB STRUCTURE

[76] Inventor: James V. Vaught, Rte. 3, Box 187, Tallassee, Ala. 36078

[21] Appl. No.: 698,960

[22] Filed: May 13, 1991

[51] Int. Cl.⁵ .............................................. B23Q 3/00
[52] U.S. Cl. .................................................. 269/48.3
[58] Field of Search ............... 269/48.1, 48.2, 48.3, 269/48.4, 50, 52, 53, 54.1, 54.5, 900, 309, 310; 279/2 R

[56] References Cited

U.S. PATENT DOCUMENTS

| | | | |
|---|---|---|---|
| 2,350,630 | 6/1944 | Melcher | 269/48.4 |
| 3,424,050 | 1/1969 | Burrow et al. | 269/48.4 |
| 3,565,416 | 2/1971 | Williamson | 269/48.1 |
| 4,565,476 | 1/1986 | Smith | 279/2 R |
| 4,700,488 | 10/1987 | Curti | 269/48.4 |
| 5,005,814 | 4/1991 | Gumbert | 269/309 |

*Primary Examiner*—Robert C. Watson
*Attorney, Agent, or Firm*—Jennings, Carter, Thompson & Veal

[57] ABSTRACT

A work holder for honeycomb structures utilizing a set of expandable fingers mounted on an engagement plate for insertion into the cells of a honeycomb structure such that a stripper plate carrying a plurality of pins aligned with said fingers may be brought into abutment with the engagement plate to seat the pins within the fingers thereby urging the fingers into secure gripping contact with the walls of the honeycomb cells to secure the structure during machining thereof.

14 Claims, 3 Drawing Sheets

FIG. 1
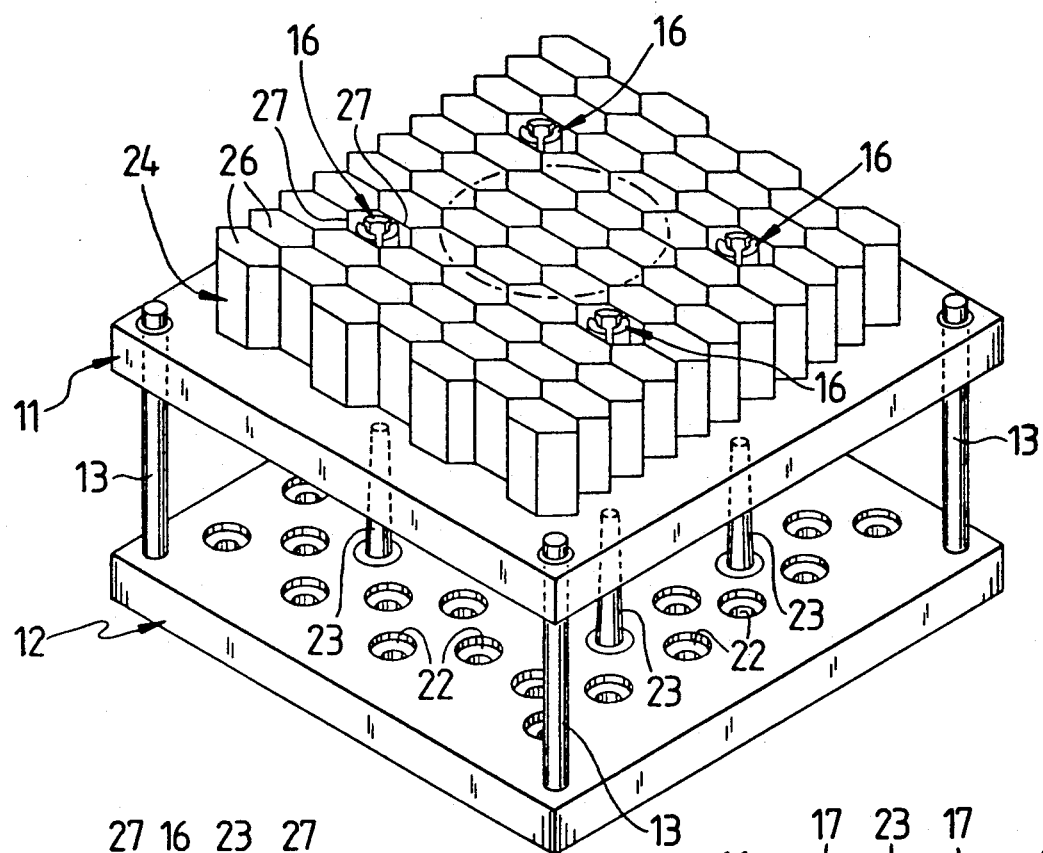
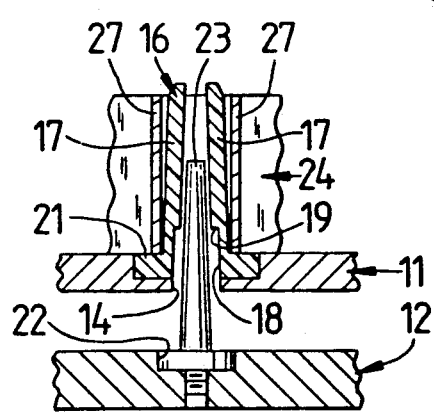
FIG. 2
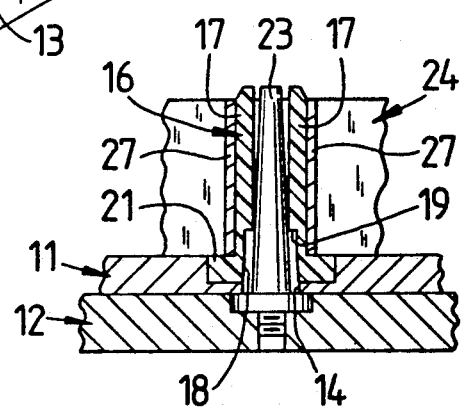
FIG. 3

WORK HOLDER FOR HONEYCOMB STRUCTURE

FIELD OF THE INVENTION

The present invention relates generally to machine tools and more specifically to work holders which hold an article to be machined by a tool. In greater particularity the present invention relates to a work holder which can position a section of honeycomb material and hold such material while the material is shaped or formed in a machine configuration.

BACKGROUND OF THE INVENTION

Honeycomb materials made from fiberglass, metals, kraft paper and other materials and are used in a variety of applications including personal shelters, electronic enclosures, intermodal cargo containers, radomes, aircraft structural parts and fairings, and heat shields. Such honeycomb materials come in a variety of cell configurations and dimensions including hexagonal cells, square cells and non-linear cells. In all honeycomb structures known to me the cells are connected by interstitial walls and form a linear array or matrix of columns and rows. While the obvious weight and strength ratios of honeycomb materials make such materials highly desirable in the aforementioned and other applications, the use of honeycomb material is not without its problems. A primary difficulty has been encountered in holding honeycomb material while it is being machined into various shapes. Heretofore, honeycomb materials have been held to the work surface of a machine tool by freezing water within the cells and machining the frozen honeycomb to the desired shape. Obviously, this method is quite messy; however, it is the only means known to me for performing this task.

SUMMARY OF THE INVENTION

It is the principal object of my invention to provide a piece holder for honeycomb materials that can easily and effectively hold the material in position on a work surface for machining by a machine tool.

In furtherance of the primary object, it is the object of this invention to hold honeycomb material in position without distorting the cells thereof.

It is yet another object of the invention to provide a work holder for honeycomb material which does not interfere with the machine tool in any manner.

These and other objects and features of my invention are advantageously accomplished though the use of internal gripping means for engaging the cell walls at selected locations within the honeycomb structure. More specifically the gripping means is a plurality expandable fingers which are insertable within the cells of the structure and selectively radially urged into engagement with the cell walls to hold the honeycomb while it is being machined.

BRIEF DESCRIPTION OF THE DRAWINGS

Apparatus embodying features of my invention is depicted in the accompanying drawings which from a portion of this disclosure and wherein:

FIG. 1 is a perspective view of my invention supporting a block of honeycomb material;

FIG. 2 is a sectional view taken perpendicular to a pin and finger of my invention showing the finger internally of a cell in a non-wall engaging position;

FIG. 3 is a sectional view as in FIG. 2 showing the finger urged into wall engagement by the pin;

DESCRIPTION OF THE PREFERRED EMBODIMENT

Figure 4:
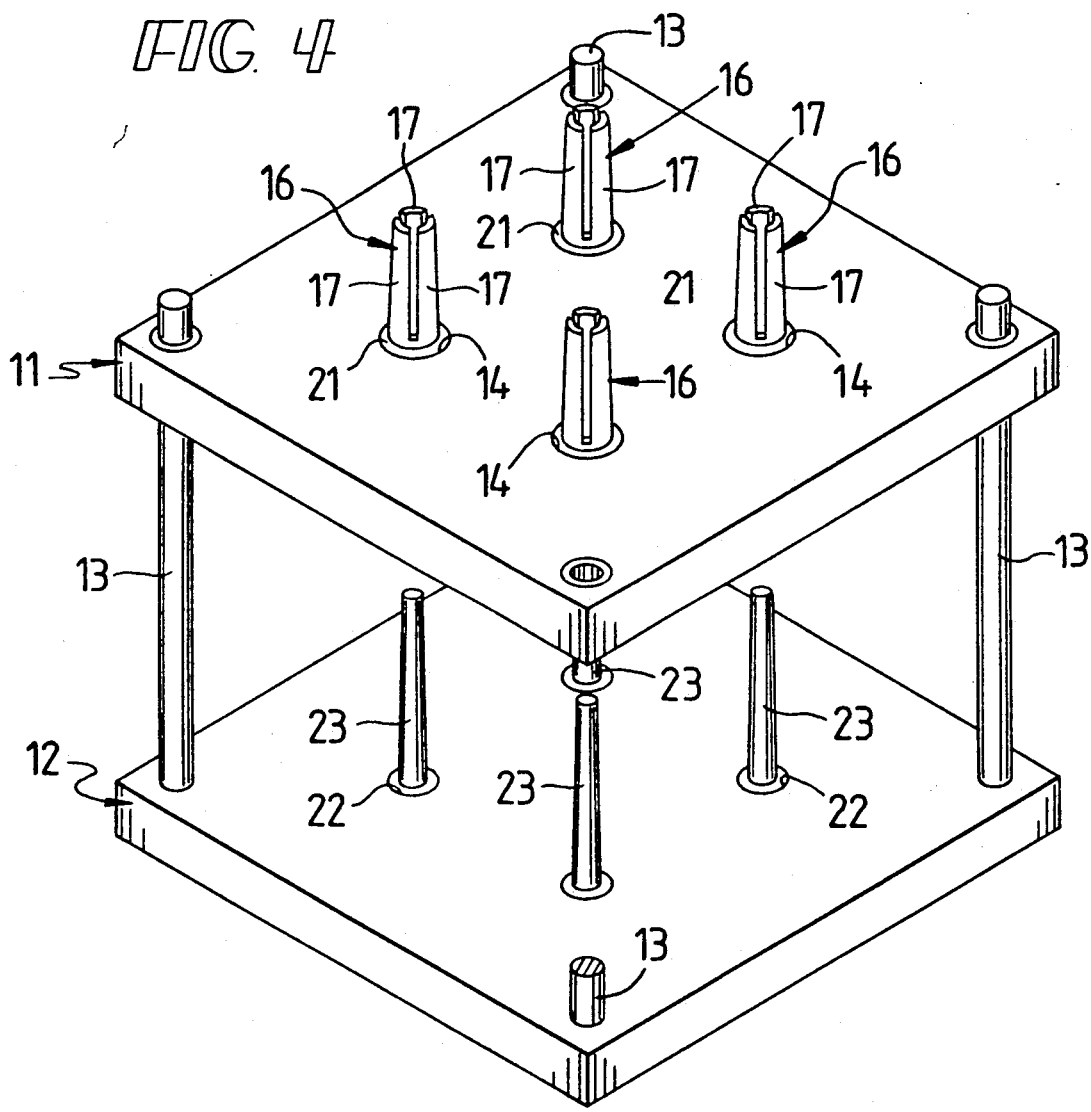
FIG. 4 is a perspective view of a second embodiment of my invention.

Referring to the figures for a clearer understanding of my invention it may be seen in FIG. 1 that my invention uses an upper engagement plate 11 and a lower stripper plate 12. A plurality of guide rods 13 are provided at the corners of the plates 11 and 12 to maintain alignment of the plates at all vertical separations thereof. In one embodiment my engagement plate has a plurality of expansion fingers 16 as shown in FIGS. 2 and 3. In this embodiment the expansion fingers 16 may be selectively positioned at any location on the plate 11 defined by a mounting orifice 14. In a second embodiment shown in FIG. 4 the expansion fingers 16 are mounted at specific locations on the plate 11.

In either embodiment it should be noted that the expansion fingers 16 are defined by a plurality of elongated segments 17 integrally formed for flexing about an axial opening which has an enlarged diameter 18 proximal plate 11. The enlarged diameter may be defined by an internal shoulder 19 such that the portion of the segments 17 have a reduced thickness near the plate 11. An annular base 21 circumscribes the enlarged diameter and provides structural connection between the otherwise unconnected segments 17. The base 21 may be threaded into a portion of mounting orifice 14 or may be otherwise detachably and reattachably connected therein. Orifice 14 may have an enlarged portion for receiving the annular base 21.

As may be seen in FIGS. 1-3, in the first embodiment the stripper plate 12 has a plurality of receptacles 22 formed therein for detachably and reattachably affixing a plurality of pins 23 which are aligned with the fingers 16. In the second embodiment, shown in FIG. 4 these pins are positioned in fixed alignment with the fingers 16. Each pin 23 includes an upper shaft-like portion which is insertable within the axial opening of the finger 16 and has a diameter sufficient to urge the elongated section 17 radially outwardly upon insertion into said opening. In as s much as a uniform spreading of the segments is desired the pin may be lightly tapered to allow complete insertion into the opening. The enlarged diameter region 18 of the finger 16 increases flexibility and also prevents premature binding of the pin in this region. Fingers 16 are preferably made from a plastic or rubber-like material such that the exterior therein has good adherence to the wall of a honeycomb structure such as shown at 24. The pins 23 are made of a rigid material, preferably teflon or aluminum, which is easily insertable within the opening without creating a large component of vertical force. The fingers may also include a threaded base portion for affixation in the receptacle 22.

In operation the honeycomb structure 24 is placed on the engagement plate 11 as shown in FIGS. 1 and 2 such that the enlargeable fingers 17 are each loosely received within a cell 26 defined by the interstitial walls 27 of the structure 24. It will be appreciated by those familiar with the art that the cell shape and size varies with the honeycomb structure and its usages. Nonetheless a plurality of cells in a regular array are found in the structure. The engagement plate 11 with the structure and the stripper plate 12 are then brought into abutment such that the pins 23 are fully seated within the axial opening and the segments 17 are urged against the cell walls 27. Obviously the elongated segments 17 should be configured to assure maximum surface area contact with the cell wall 27 when they are urged radially by the pins 23. The fingers 16 and pins 23 are located so as to provide adequate holding force on the structure 24 and due to their mode of engagement may be machined with the honeycomb 24 if such is necessary. It is, of course, preferable to locate the pins 23 and fingers 17 for insertion into cells which require little or no machining. As may be seen in FIG. 6, the pins 23 and fingers 16 are located in portion of the structure 24 outside of the circular area which has been recommended by machining.

Figure 6:
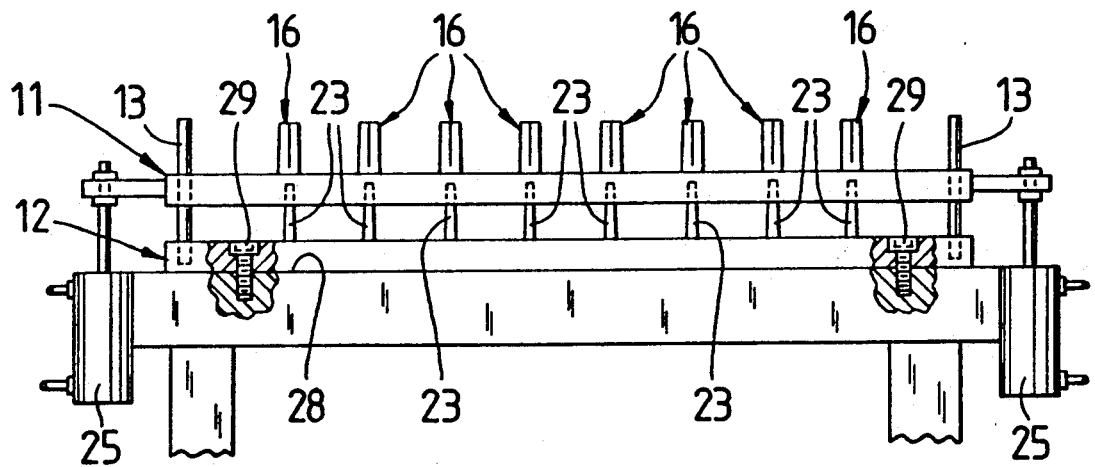
FIG. 6 is a side elevational view of another embodiment of my invention.
Figure 5:
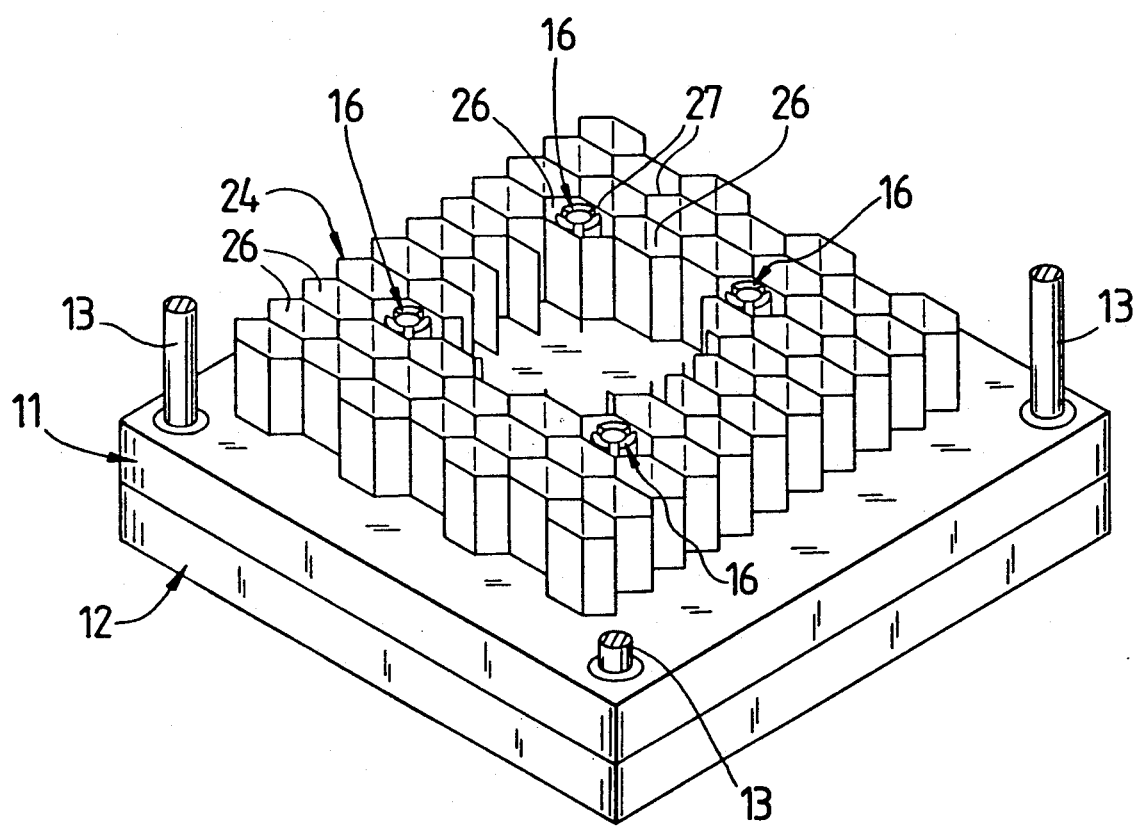
FIG. 5 is a perspective view of my invention supporting a machined block of honeycomb material.

It will also be appreciated that although the plates 11 and 12 may be brought into abutment and separated manually, various devices may be employed to mechanically move one or the other plate. In FIG. 6, I have provided a set of linear actuators 25 which move plate 11 along guides 13 to engage and disengage the pins and fingers. Plate 12 is affixed to the work surface 28 of a machine tool in a conventional manner by bolts 29.

From the foregoing it may be seen that I have devised an apparatus that can hold a honeycomb structure securely atop a work station such that a machine tool may perform any desired operation on the structure to smooth, contour or cut the structure as desired. Further the gripping elements or fingers and pins may be appropriately sized for any type honeycomb cell structure thereby providing a holder of wide application.

While I have shown my invention in several forms, it will be obvious to those skilled in the art that it is not so limited but is susceptible of various changes and modifications without departing from the spirit thereof.

What I claim is:

1. Apparatus for securing a honeycombed member having a plurality of interconnected wall members defining a plurality of adjacent open cells, comprising in combination:
   (a) expandable engagement means for insertion in selected cells of a honeycomb structure and having a plurality of elongated expansion fingers with each finger having an axial opening therethrough and divided into a plurality of elongated segments;
   (b) means for holding said expandable engagement means in a predetermined arrangement; and
   (c) means for selectively urging said expandable engagement means into abutment against cell defining walls within said honeycomb structure and including an associated pin aligned with said axial opening of each said finger and insertably and retractably movable therewith such that insertion thereof urges said elongated segments radially outwardly, wherein each said associated pin is carried on a stripper plate for selective movement relative to said axial opening, said stripper plate having a matrix of receptacles aligned with said central openings.

2. Apparatus as defined in claim 1 wherein each expansion finger is integrally formed with an annular base member having a central aperture aligned with said axial opening with said base being affixed to each of said elongated segments.

3. Apparatus as defined in claim 2 wherein said axial opening and said central aperture have a combined diameter proximal said base and said axial opening has a reduced diameter over the remainder thereof.

4. Apparatus as defined in claim 2 wherein said fingers are beveled at an end thereof distal said base.

5. Apparatus as defined in claim 1 wherein said means for holding comprises a substantially plate-like member having a plurality of mounting orifices formed therein for selective mounting therein of said annular bases in alignment with selected cells of said honeycomb structure.

6. Apparatus as defined in claim 1 wherein said means for holding comprises a plate-like member affixed to said elongated fingers and having an aperture therethrough aligned with the central opening of each finger.

7. Apparatus as defined in claim 1 further comprising means for selectively moving said stripper plate and said plate-like member relative to each other.

8. Apparatus as defined in claim 1 further comprising means for guiding said stripper plate and said plate-like member during relative movement therebetween to insure alignment of said pins and apertures.

9. Apparatus as defined in claim 1 wherein said elongated segments expand radially to engage said walls of said honeycomb without deforming said walls.

10. Apparatus for holding a honeycomb material in position during machining thereof comprising:
    (a) means insertable within selected cells of said honeycomb material for selectively engaging interstitial walls defining said cells, wherein said engaging means comprises an engagement plate having a plurality of engagement fingers attached thereto, said engagement fingers having a plurality of elongated segments surrounding an axial opening and being individually radially flexible relative thereof, with each engagement finger being adapted for insertion within a cell; and
    (b) means associated with said insertable means for urging said engaging means into engagement with said interstitial walls, wherein said means for urging includes a stripper plate carrying a plurality of insertion pins thereon with each insertion pin aligned with and movable within an axial opening of an engagement finger to induce radial movement of said elongated segments.

11. Apparatus as defined in claim 10 wherein said engagement fingers are detachably and reattachably affixed to said engagement plate for selective positioning thereon to engage selected cells.

12. Apparatus as defined in claim 10 wherein said insertion pins are detachably and reattachably affixed to said stripper plate such that said pins are positionable thereon in alignment with said engagement fingers.

13. Apparatus as defined in claim 12 wherein said fingers engage said interstructural walls within cells which are outside any area of said honeycomb structure to be worked on.

14. Apparatus as defined in claim 12 wherein said fingers and pins are made of a material which can be removed with the surrounding portion of said honeycomb to permit machining thereof at a cell engaged by said finger.

* * * * *